Jan. 7, 1969    A. D. STRAHM    3,419,992
CLOSED FACE FISHING REEL ATTACHMENT
Filed Aug. 25, 1965

INVENTOR.
ALLEN D. STRAHM
BY
Head & Johnson
ATTORNEYS

United States Patent Office 3,419,992
Patented Jan. 7, 1969

3,419,992
CLOSED FACE FISHING REEL ATTACHMENT
Allen D. Strahm, 3150 S. Atlanta Ave.,
Tulsa, Okla. 74105
Filed Aug. 25, 1965, Ser. No. 482,489
U.S. Cl. 43—20    4 Claims
Int. Cl. A01k 87/06

ABSTRACT OF THE DISCLOSURE

A U-shaped bracket positioned beneath the handle of the fishing rod includes a closed face spinning reel positioned upon the bracket. A thumb actuated release member extends to a position atop the rod in position when naturally gripping said handle and is adapted to actuate the braking and releasing mechanism of the reel.

This invention relates to fishing rods and reels. More particularly, this invention relates to an attachment for fishing rods for supporting spinning reels, preferably of the closed face type.

Closed face spinning reels typically used today normally require actuation by thumb pressure requiring that the reel be positioned atop the rod for the natural movement. A closed face reel does not require further finger control or actuation as with open face reels, which are positioned beneath the rod. In addition, positioning of the reel and line beneath the rod takes advantage of more efficient line travel and balance. It is further desirable in typical fishing situations and conditions to utilize very light weight rods, e.g., about two ounces, which are light primarily by reason of elimination of heavy metal reel locking portions.

It is a primary object of this invention to provide an attachment for the handle of fishing rods which is adapted to support a closed face type spinning reel beneath the rod handle, and wherein the fishing line is adapted to be suspended and travels beneath the rod.

Another object of this invention is to provide an attachment for supporting a closed face type spinning reel beneath the handle of a light weight fishing rod and wherein the attachment is provided with finger or thumb control means atop the rod.

A still further object of this invention is to provide an attachment for light weight fishing rods or similar tackle for positioning a closed face type spinning reel beneath the operator's handle which can either provide means for attaching the reel or the reel may be combined therewith and which provides ease of balance and handling without excessive or unnecessary hand or fingering maneuvers.

A still further object of this invention is to provide an attachment for fishing rods which is adapted to position a closed face type spinning reel beneath the rod and which is convertible from left hand to a right hand operation without substantial modification.

These and other objects of this invention will become more apparent upon further reading of the specification and claims when taken in conjunction with the following illustrations of which:

Figures 1, 2:
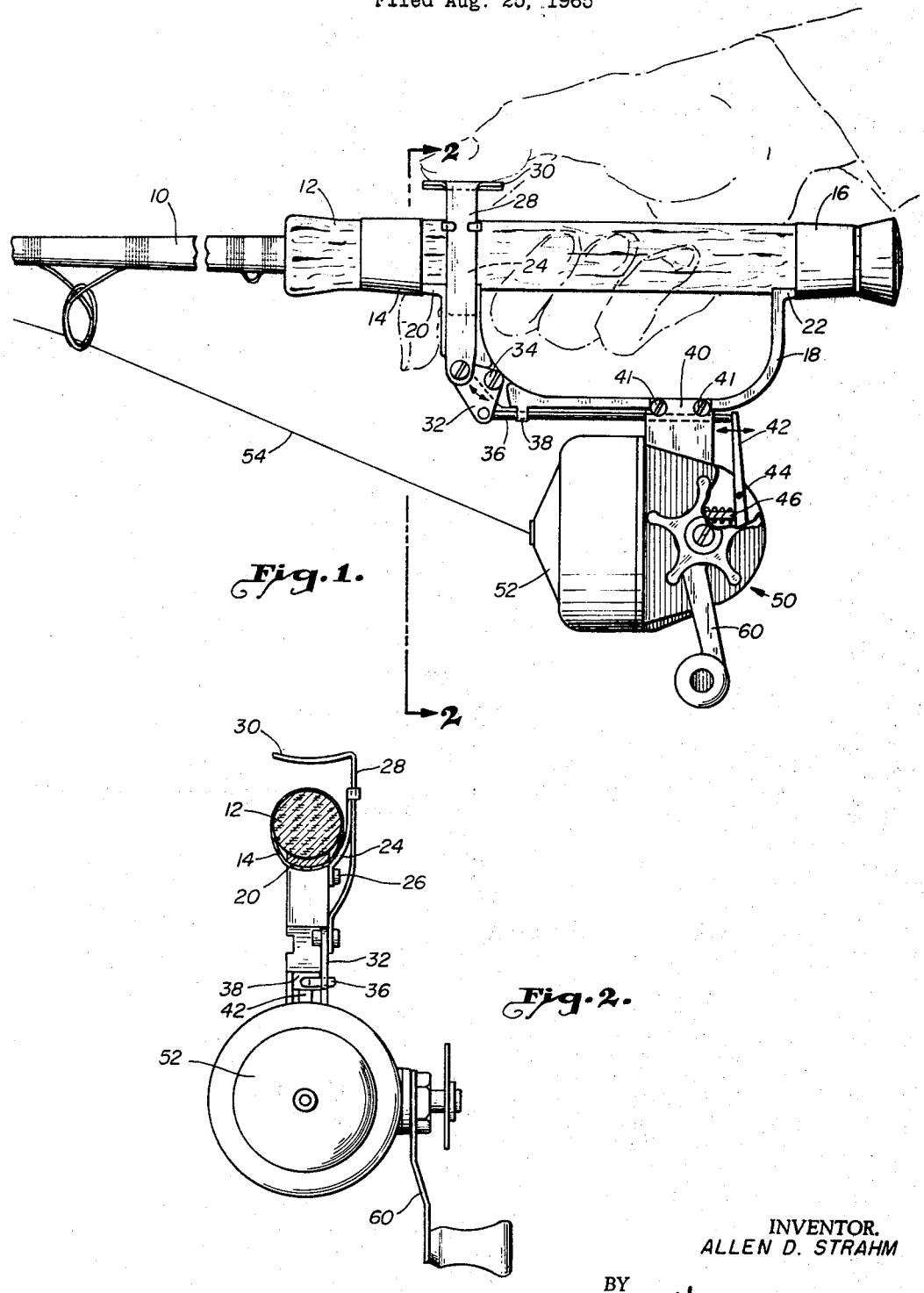
FIGURE 1 is a side elevational view of the attachment of this invention showing the reel in place.
FIGURE 2 is a front elevational view, partly in section, taken along the line 2—2 of FIGURE 1.

Referring now to the figures, a light weight or ultra-light weight fishing rod 10 is generally of the type including a cork or other buoyant material handle 12, which is positioned at or adjacent the end of the rod 10. The handle includes sliding reel attachment sleeves 14 and 16 which are normally adapted to clasp and retain the tang members ordinarily associated with most fishing reels commercially available.

The attachment of this invention includes a U-shaped bracket 18 which includes tang portions 20 and 22 at the free end of each leg of the bracket. These act in conjunction with attachment sleeves 14 and 16 which act to wedge and lock the bracket in position. Bracket 18 forms the basic reel supporting means and operating mechanism. A vertical guide member 24 is attachable to the bracket by screw 26. The guide bracket 24 is adapted to receive the vertical portion 28 of the thumb release and braking member for reciprocating movement therein. The thumb release member includes an upper thumb release portion 30 which is affixed in a relatively horizontal plane above the upper side of the handle 12 and is contoured for the natural shape of the inner surface of a human thumb. The lower end of the vertical portion 28 is pivotally attached to a pivotal crank 32 which itself is pivotal about shaft 34 which also acts to retain the crank 32 in position, yet is removable by a threaded attachment. Lever arm 36 is likewise pivotally attached at one end to the crank 32 so as to move, upon actuation of the thumb release member in a relatively horizontal plane as shown by the arrows. The lever arm 36 is supported by guides 38 and 40 terminating against release lever 42 of reel 50. The spool release lever 42 is pivotal about shaft 44 and is adapted to actuate spring-biased brake and spool release shaft 46 which is typically formed as a part of a closed face type of spinning reel 50. By a closed face type of spinning reel is meant that type of reel wherein a line spool, and spooling member not shown, are ordinarily covered by a cap, identified by the numeral 52, and which is adapted to provide a forward central guided release of the fishing line 54 through the eyelets 11 of the fishing rod. Bracket 40 is adapted to be attached to or formed as a molded part thereof of reel 50 and includes screws 41 for ready attachment to the bracket 18 unless otherwise integrally formed or retained thereto.

In operation, the device as shown in the view is for a right-handed person wherein the reel 50 is wound with the left hand while the right hand is utilized to grasp the handle somewhat as shown. It is to be understood, however, that because of the adaptation and design and shape of bracket 18, guide bracket 24 and pivotal crank 32 may be readily reversed to the other side of bracket 18 utilizing the same parts to convert the fishing attachment to left-handed operation or the parts remain and reel 50 is replaced or reversed for left-hand operation. Typically, a closed face spinning reel 50 includes the cover 52 which, when disposed in place, encloses the forwardly working components of the reel including a fixed spool, not shown, which is circular in shape, upon which the fishing line 54 is wound. A line spooling pick-up member, not shown is adapted to, in one position, wind the line about the fixed spool upon rotation of the knob and handle 60. In a second position, when release shaft 46 is moved forward the pick-up member is released or is positioned out of the way to permit complete release of the line from the spool by the momentum of a weighted lure attached to the end of line 54. In the second position, a line braking member, also not shown, is actuated simultaneously as long as shaft 46 remains forward to clamp or brake the flow of line. When it is desired to cast, the operator presses thumb release member 30 forcing vertical portion 28 downward and hence pivoting crank 32 about shaft 34. This same motion causes lever arm 36 to advance rearwardly actuating release lever 42 and move shaft 46 forward to function in the two-fold manner above described. As long as the thumb release member 30 is held down, the line is still braked until the time for release is desired at which time the thumb is released. Any further braking action, which is built into many closed face types of spinning reels, can be accomplished by subsequently depressing the thumb release member to limit the line travel. After the cast, the operator, with the other hand, rotates crank 60 which places the pick-up mechanism back in casting operation and presets the reel for the operation above described.

What is claimed:
1. A fishing means comprising the combination of
   a fishing rod having line eyelets beneath said rod, a grippable handle adjacent one end of said rod and attachment sleeves associated with said handle for axial movement;
   a U-shaped bracket having means at the free end of each leg of said bracket for cooperative engagement with said attachment sleeves to retain said bracket beneath said handle so as to not interfere with the hand grippable portion of said handle;
   a closed face fishing reel supported upon and below said bracket, said reel including a line release and brake shaft; and
   a reel actuating system supported by said bracket and including a release mechanism situated such that one end is atop said handle and depressible downward by the thumb of said hand when in natural position about said grippable portion, and means between said thumb release mechanism and said shaft for actuation as said release mechanism is depressed and released.

2. An attachment for supporting closed face fishing reels beneath a fishing rod handle comprising
   a U-shaped bracket, said bracket including:
   (1) means at the free end of each leg of said bracket to permit attachment of said bracket to and beneath said handle,
   (2) means to support said reel below said bracket, said reel including a fishing line pick-up release and line brake shaft, and
   (3) an actuating system supported by said bracket and including a thumb release mechanism situated at one end atop said handle to be depressible downward and inter-engageable with said shaft for actuation thereof.

3. The combination of a fishing rod having fishing line eyelets normally beneath said rod;
   a grippable handle adjacent one end of said rod,
   a bracket attached as a part of said rod beneath said handle so as to not interfere with the hand grippable portion of said handle,
   means for attaching a closed face spinning reel beneath said bracket and below said handle, said reel including a line brake and release shaft, and
   actuating system supported by said bracket and including a release mechanism situated stop said handle to be depressible downward by the thumb of said hand when in natural position about said grippable portion and including means cooperating therewith to inter-engage with said line brake and release means for actuation thereof.

4. A fishing means comprising the combination of:
   a fishing rod having line eyelets beneath said rod, a handle adjacent one end of said rod and attachment sleeves associated with said handle for axial movement;
   a U-shaped bracket having means at the free end of each leg of said bracket for cooperative engagement with said attachment sleeves to retain said bracket beneath said handle;
   a closed face fishing reel supported below said bracket, said reel including a line release and brake shaft;
   a reel actuating system supported by said bracket and including a thumb release mechanism situated such that one end is atop said handle and depressible downward; and
   means between said thumb release mechanism and said release and brake shaft including a pivotal crank attached to said U-shaped bracket with the other end of said thumb release mechanism being attached to said pivotal crank, and a lever arm slidably supported on said U-shaped bracket, one end of said lever arm being attached to said pivotal crank, the other end of said lever arm being operatively engageable with said release and brake shaft for actuation as said thumb release mechanism is depressed or released.

References Cited
UNITED STATES PATENTS

| | | | |
|---|---|---|---|
| 2,834,559 | 5/1958 | Nagy | 43—20 X |
| 2,028,311 | 1/1936 | Berry | 43—20 |
| 2,929,579 | 3/1960 | Hull | 242—84.2 |

SAMUEL KOREN, *Primary Examiner.*

DANIEL J. LEACH, *Assistant Examiner.*

U.S. Cl. X.R.

43—22; 242—84.2